United States Patent
Atkin

(10) Patent No.: US 7,086,004 B2
(45) Date of Patent: Aug. 1, 2006

(54) GENERALIZED MECHANISM FOR UNICODE METADATA

(75) Inventor: Steven Edward Atkin, Palm Bay, FL (US)

(73) Assignee: International Business Machines Corporation, Armonk, NY (US)

(*) Notice: Subject to any disclaimer, the term of this patent is extended or adjusted under 35 U.S.C. 154(b) by 894 days.

(21) Appl. No.: 09/838,376

(22) Filed: Apr. 19, 2001

(65) Prior Publication Data

US 2003/0023590 A1     Jan. 30, 2003

(51) Int. Cl.
*G06F 15/00*     (2006.01)

(52) U.S. Cl. .................. 715/531; 715/526; 704/8; 708/205

(58) Field of Classification Search .......... 704/8; 345/467; 341/50, 190; 709/217; 715/531, 715/526, 530, 536; 707/101; 708/205; 717/106
See application file for complete search history.

(56) References Cited

U.S. PATENT DOCUMENTS

| | | | | |
|---|---|---|---|---|
| 5,784,069 | A * | 7/1998 | Daniels et al. | 345/467 |
| 5,793,381 | A * | 8/1998 | Edberg et al. | 345/467 |
| 5,889,481 | A * | 3/1999 | Okada | 341/51 |
| 5,929,792 | A * | 7/1999 | Herriot | 341/55 |
| 5,946,648 | A * | 8/1999 | Halstead et al. | 704/9 |
| 6,070,179 | A * | 5/2000 | Craft | 708/203 |
| 6,151,624 | A * | 11/2000 | Teare et al. | 709/217 |
| 6,204,782 | B1 * | 3/2001 | Gonzalez et al. | 341/90 |
| 6,397,259 | B1 * | 5/2002 | Lincke et al. | 709/236 |
| 6,438,516 | B1 * | 8/2002 | Davis | 704/8 |
| 6,493,735 | B1 * | 12/2002 | Kumhyr | 715/536 |
| 6,944,820 | B1 * | 9/2005 | Feinberg | 715/526 |

OTHER PUBLICATIONS

Davis et al., "Unicode", IEEE, 1990, pp. 499-504.*
Mark Davis "Unicode Standard Annex #9—The Bidirectional Algogithm", published online at http://www.unicode.org/unicode/reports/tr9/tr9-9.html, printed Mar. 23, 2001, pp. 1-24.*
Whistler et al., "Language Tagging in Unicode Plain Text", ACM, Jan. 1999, pp. 1-14.*
Goldsmith et al., "A Mail-Safe Transformation Format of Unicode", May 1997, pp. 1-15.*
Altkin et al., "Implementations of Bidirectional Reordering Algorithms," Florida Tech Technical Report CS-2000-1, pp. 1-10.*

(Continued)

*Primary Examiner*—Heather R. Herndon
*Assistant Examiner*—Maikhanh Nguyen
(74) *Attorney, Agent, or Firm*—Robert H. Frantz; Mark S. Walker

(57) ABSTRACT

A extendable method for including display rendering metadata within Unicode character streams. Metadata is distinct from character data, even though it is embedded in the Unicode character stream using tag mechanism. The method allows for an unlimited number of tag identifiers. Legacy Unicode methods such as Bidi, Normalization, and Line Breaking, can be recast using the invention in a more manageable context according to the metadata framework, thereby allowing the methods to be detectable, reversible as well as convertible. The traditional Unicode Control Layer is eliminated because the syntax of controls are captured universally by the new Metadata Layer, irrespective of whether the control relates to presentation or pcontent. By replacing the indistinct boundary separating characters and control with a well defined division, applications that rely on Unicode are easier to develop and to maintain.

24 Claims, 4 Drawing Sheets

OTHER PUBLICATIONS

M. Mudawwar, "Multicode: A Truly Multilingual Approach to Text Encoding," IEEE, vol. 30, Issue 4, Apr. 1997, pp. 37-43.*

"Unicode Standard Annex #15—Unicode Normalization Forms" by the Unicode Consoritium, published online at http://www.unicode.org/unicode/reports/tr15, printed Jan. 9, 2001.

"Plane 14 Characters for Language Tags" by Unicode Consortium, published online at http://www.unicode.org/reports/tr7., printed Jan. 9, 2001.

Martin Dürst and Asmus Freytag, "Unicode in XML and Other Markup Languages", published online at http://www.unicode.org/unicode/reports/tr20, printed Jan. 9, 2001.

* cited by examiner

*Prior Art*

GENERALIZED MECHANISM FOR UNICODE METADATA

FEDERALLY SPONSORED RESEARCH AND DEVELOPMENT STATEMENT

This invention was not developed in conjunction with any Federally sponsored contract.

MICROFICHE APPENDIX

Not applicable.

CROSS REFERENCE TO RELATED APPLICATIONS

This application is related to U.S. patent application Ser. No. 09/838,377, entitled "BI-DIRECTIONAL DISPLAY" filed Apr. 19, 2001, which is incorporated herein by reference for all purposes in its entirety.

BACKGROUND OF THE INVENTION

1. Field of the Invention

This invention relates to the technologies of computer displays and interpretation of file and data for display on a computer. This invention especially relates to the technologies of universal text encoding, markup languages, and data-to-display methods.

2. Description of the Related Art

The many competing motivations for selecting codepoints within a text encoding standard, such as the Unicode standard, threaten the fundamental purpose of a character encoding: data. Digital data is immensely convenient because the advantages of its great simplicity outweigh the loses incurred by representing knowledge imperfectly.

Often, in pursuit of all the benefits of such as standard, we set our sights on recovering on what has been left out. For many years, numerical analysts have been systematically improving fidelity of computer models of the apparently continuous world around us. They are helped by the mathematical properties of real numbers. A more difficult challenge is text which represents language.

In fact, we contend that the ability to interpret raw text has become more difficult. A text stream is no longer just a sequence of agreed upon codepoints. Text manipulation processes require additional information for proper interpretation, such as displaying the encoded text on a computer display or mobile telephone display.

There has been substantial interest in introducing an architecture for describing language and other semantic information within raw Unicode streams.

The need for expressing metadata, e.g. information describing data, has existed ever since humans started communicating each other. Prior to written communication, metadata was expressed through our verbal speech. The tone, volume, speed in which something was spoken often signaled its importance or underlying emotion. Often, the metadata may be as significant or even more significant that the data itself, and often much more difficult to codify.

Writing and printing systems also have a need for metadata. This was conveyed through the use of color, style, size of glyphs. Initially, this metadata was used as a mechanism for circumventing the limitations of early encoding schemes. As our communication mechanisms advanced so did our need for expressing metadata.

FIG. 1 presents the Unicode character/control/metadata model, including an application layer (10), a control layer (11), a character layer (12), a codepoint layer (13), and a tranmission layer (14). Unicode is well known in the art, and many alternate representations can be found in widely available literature.

A primary need for metadata in Unicode occurs in the control layer (11), as one may anticipate. In FIG. 1, a dotted line is used to separate the character layer (12) from the control layer (11) to illustrate the sometimes difficult to define boundary separating characters from control. This inability to provide a clean separation has made the task of developing applications (10) that are based on a Unicode more difficult to implement.

For greater understanding of the present invention, a historical summary is first presented which demonstrates the need for metadata within character encodings. Second, an examination of the presently available paradigms for expressing metadata is provided. In particular, attention is given to both extensible markup language (XML) and Unicode's character/control/metadata model.

Baudot's 5-bit teleprinter represents one of the earliest uses of metadata Baudot divided his character set into two distinct planes, named Letters and Figures. The Letters plane contained all the Uppercase Latin letters, while the Figures plane contained the Arabic numerals and punctuation characters. These two planes shared a single set of code values.

To distinguish their meaning, Baudot introduced two special meta-characters, letter shift "LTRS" and figure shift "FIGS". When a sequence of codepoints were transmitted, it was preceded by either the FIGS or LTRS character. This permitted the characters to be interpreted unambiguously. This is similar to the shift lock mechanism in typewriters. For example, line 1 in FIG. 2 spells out "BAUDOT" while line 2 spells out "?-7$95", as shown in TABLE 1.

TABLE 1

| | Using LTRS and FIGS in Baudot code |
|---|---|
| 1 | 0x1F 0x19 0x03 0x07 0x09 0x18 0x10 BAUDOT |
| 2 | 0x1B 0x19 0x03 0x07 0x09 0x18 0x10 ?7$95 (2) |

However, this method still left the problem of how to transmit a special signal to a teleprinter operator. Baudot once again set aside a special code point, named bell "BEL". This codepoint would not result in anything being printed, but rather it would be recognized by the physical teleprinter. The teleprinter, having recognized the BEL, character would perform some action, such as ringing of a bell.

About 1900, metadata characters began to be used as format effectors, such as can be seen in Murray's code. Murray's code introduced two additional characters: (a) column (COL) carriage return in International Telegraphy Alphabet Number 2 (ITA2), and (b) line page (LINE PAGE) line feed in ITA2. These two codes were used to control the positioning of the print wheel, and to control the advancement of paper. This encoding scheme was used for nearly fifty years with little modification. It also served as the foundation for future encoding techniques.

During the late 1950s and early 1960s, telecommunication hardware rapidly became much more complex. This complexity, however, resulted in the need for more sophisticated protocols, and for greater amounts of metadata. For this purpose, the US Army introduced a 6-bit character code called "FIELDATA." FIELDATA introduced the concept of "supervisor codes", known today has "control codes." These codepoints were used to signal communications hardware.

The hardware manufacturers were certainly not the only users of metadata, however. It did not take long for the data processing community to realize that they also had uses for metadata. This unfortunately taxed the existing encoding schemes (5-bit and 6-bit) so much so as to render them unusable, as all of the potential codes to be incorporated to address all of the user needs could not be represented in such a small code space.

This drove the creation of a richer and more flexible encoding scheme. These issues were directly addressed by the American Standard Code for Information Interchange (ASCII).

The ASCII code, a 7-bit encoding, served not only as a mechanism for data interchange, but also as an architecture for describing metadata. This metadata could be used for communicating higher order protocols in hardware as well as software. The architecture is based upon ASCII's escape character (ESC) at hex value 0×1B.

Initially, the ESC was used for shifting to one or more character sets. This was of a particular importance to ALGOL programmers. As ASCII was adopted internationally, the ESC became useful for signaling the swapping in and out of international character sets. This concept was later expanded in 1980s in the International Standards Organization (ISO) ISO-2022 standard.

ISO-2022 is an architecture and registration scheme for allowing multiple 7-bit or 8-bit encodings to be intermixed. It is a modal encoding system like Baudot. Escape sequences or special characters are used to switch between different character sets or multiple versions of the same character set. This scheme operates in two phases. The first phase handles the switching between character sets, while the second handles the actual characters that make up the text.

Non-modal encoding systems make direct use of the byte values in determining the size of a character. In such a scheme, characters may vary in size within a stream of text, typically ranging from one to three bytes. This can be witnessed in the well-known UTF-8 and UTF-16 encodings.

In ISO-2022, up to four different sets of graphical characters may be simultaneously available, labeled G0 through G3. Escape sequences are used to assign and switch between the individual graphical sets. For example, line 1 in TABLE 2 shows the byte sequence for assigning the ASCII encoding to the G0 alternate graphic character set. Line 2 of TABLE 2 shows the Latin-1 encoding being assigned to the G1 set.

TABLE 2

Example ISO-2022 Escape Sequences

| 1 | ESC 0x28 0x42 | assign ASCII to G0 |
|---|---|---|
| 2 | ESC 0x2D 0x41 | assign Latin 1 to G1 |

Most data processing tools make little if any distinction amongst data types. The only distinctions being purely human user interpretation. Data is simply viewed by the processing tools in terms of bytes. For example, the common UNIX text searching utility known as GREP assumes that data is represented as a linear sequence of stateless fixed length independent bytes. GREP is highly flexible when it comes to searching, whether it be characters or object code. This model has served well under the assumption that one character equals one codepoint, but encoding systems have advanced and user expectations have risen.

Over the last ten or so years, Unicode has become the defacto standard for encoding multilingual text. This has brought a host of new possibilities that only few could have previously imagined. Users however, want more than just enough information for intelligible communication. Plain text in its least common denominator is simply insufficient.

There have been several discussions concerning the enrichment of plain text of which ISO-2022 is one. Even XML can be viewed in this framework. Both concern meta information yet have different purposes, goals, and audiences. The transition from storing and transmitting text as plain streams of code-points is now well underway.

Extensible markup language (XML) provides a standard way of sharing structured documents, and for defining other markup languages. XML uses Unicode as its character encoding for data and markup. Control codes, data characters, and markup characters may appear intermixed in a text stream.

When this situation is combined with overlapping mechanisms for encoding higher order information, confusion and ambiguity may ensue when processing or interpreting the encoded data There may exist situations in which markup and control codes should not be interleaved. This issue is quickly coming to realization within XML and Unicode.

Whitespace characters in XML are used in both markup and data. The characters used in XML to represent whitespace are limited to "space", "tab", "carriage return", and "line feed". Unicode, on the other hand, offers several characters for representing whitespace. In particular, the line separator U2028 and the paragraph separator U2029. Their use however within XML may lead to ambiguities due to the additional implied semantics.

In Unicode, these characters may be used to indicate hard line breaks and paragraphs within a stream. These may affect visual rendering, as well as serve as separators. When used within XML, however, it is unclear whether the implied semantics can be ignored. Does the presence of one of these control codes indicate that a rendering protocol is being specified in addition to their use as whitespace, or are they simply whitespace?

The use of name "tags" within XML also posses problems. The characters in the Compatibility Area and Specials Area UF900-UFFFE from Unicode are not permitted to be used in names within XML.

Their exclusion is due in part to the characters being already encoded in other places within Unicode. By no means, though, is this the only reason. If characters from the Compatibility Area were included, the issue of normalization would then need to be addressed. In this context normalization refers to names being equivalent, but not necessarily the same. Additionally, characters that pose both a decomposed and precomposed form also need attention.

Unicode attempts to address these issues in Unicode Technical Report #15 "Unicode Normalization Forms", which is freely available from the Unicode organization. Unicode provides guidelines and an algorithm for determining when two character sequences are equivalent. In general, there are two classes of normalization: Canonical and Compatibility.

Canonical normalization handles equivalence between decomposed and precomposed characters. This type of normalization is reversible. Compatibility normalization addresses equivalence between characters that visually appear the same, and is irreversible.

Compatibility normalization in particular is problematic within XML. XML is designed to represent raw data free from any particular preferred presentation. Characters that may be compatible for presentation purposes, however, do not necessarily share the same semantics. It may be the case that an additional protocol is being specified within the stream. For example, the UFB0 character on line 1 TABLE 3 is compatible with the two character sequence "U0066 U0066" on line 2. Line 1 however, also specifies an additional protocol: ligatures. In such a situation, it is unclear whether or not the names were intended to be distinct. It is difficult to tell when the control function (higher order protocol specification) of a character can be ignored and when it can not.

TABLE 3

Example Compatibility Normalization Ambiguity

| | | |
|---|---|---|
| 1 | UFB00 | ff ligature |
| 2 | U0066 U0066 | ff no ligature |

Further, some have argued that Unicode's Normalization Algorithm is difficult to implement, resource intensive, and prone to errors. To avoid such problems XML has chosen not to perform normalization when comparing names.

Problems such as these are due to the lack of separation of syntax from semantics within Unicode. The absence of a general mechanism for specifying protocols "metadata" only serves to confound these issues even further.

There are two well-known general approaches to encoding metadata within text streams: in-band signaling and out-of-band signalling. Inband signalling conveys metadata and textual content using a single shared set of characters, while out-of-band signalling conveys metadata independently from the data. In-band signalling is employed within hyper text markup language (HTML) and XML.

Determining whether a character is data or metadata using in-band-signalling depends on the context in which a character is found. That is, code points are "overloaded." This achieves maximal use of the character encoding, as characters are not duplicated. It also does not require encoding modifications as protocols change.

All of this, however, comes at the expense of the complexity of parsing the data. It is no longer possible to conduct a simple parse of a stream looking for just data or metadata.

Using out-of-band signalling for describing Unicode metadata requires the definition and transmission of complex structures serving a similar purpose as document data type definitions (DTD) in XML. This has the ill effect of making the transmission of Unicode more intricate. It would no longer be acceptable to simply transmit the raw Unicode text. Without the metadata, the meaning of the raw text may be ambiguous. On the other hand, parsing of data and metadata may be trivial, given that the two are not intermixed. The transmission problems requiring pairs of raw data files and metadata files to be handled together often may outweigh the potential parsing benefits of out-of-band signalling, depending on the application.

It is still possible to construct a metadata signalling mechanism for the specific purpose of mixing data and metadata and yet allows for simple parsing. This is the approach that is currently under discussion within the Unicode community and can be found in Unicode Technical Report #7. It is called "light-weight in-band signalling".

According to this proposed approach, this is achieved in Unicode through the introduction of a special set of characters that may only be used for describing metadata "tagging". The current model under consideration within Unicode is to add 97 new characters to Unicode. These characters would be comprised of a copy of the ASCII graphic characters, a language character tag, and a cancel tag character. These characters would be encoded in Plane 14 "surrogates" U000E0000—U000E007F. These characters could then be used to spell out any ASCII based metadata protocol which needs to be embedded within a raw Unicode stream of text. This permits the construction of simple parsers for separating metadata from data since there is no overloading of characters.

The use of the tags is very simple. First, a tag identifier character is chosen, followed by an arbitrary number of unicode tag characters. A tag is implicitly terminated when either a non tag character is found or another tag identifier is encountered. Currently there is only one tag identifier defined, the "language" tag, as shown in TABLE 4. Line 1 in TABLE 4 demonstrates the use of the fixed codepoint language tag "U000E0001", along with the cancel tag "U000E007F". The plane 14 ASCII graphic characters are in bold and are used to identify the language. The language name is formed by concatenating the language ID from ISO-639 and the country code from ISO-3166. In the future, a generic tag identifier may be added for private tag definitions.

TABLE 4

Example Unicode Light-Weight
In-band Signaling Language Tag

U000E0001 fr-Fr french text U000E0001 U000E007F

Tag values can be cancelled by using the tag cancel character. The cancel character is simply appended onto a tag identifier. This has the effect of cancelling that tag identifier's value. If the cancel tag is transmitted without a tag identifier the effect is to cancel any and all processed tag values.

The value of a tag continues until either it implicitly goes out of scope or a cancel tag character is found. Tags of the same type may not be nested. The occurrence of two consecutive tag types simply applies the new value to the rest of the unprocessed stream. Tags of differing types may be interlocked. Tags of different types are assumed to ignore each other. That is there are no dependencies between tags.

Tag characters have no particular visible rendering and have no direct affect on the layout of a stream. Tag aware processes may chose to format streams according to their own interpretation of tags and their associated values. Tag unaware processes should leave tag data alone and continue processing.

Although, the general light-weight approach to metadata definition is useful, it however posses two problems. First, new tag identifiers always require the introduction of a new Unicode codepoint. This puts Unicode as a standard in a constant state of flux, as well as fixing or limiting the number of possible tag identifiers. Second, there is no method to specify multiple parameters for a tag. This deficiency forces the creation of additional tag identifiers to circumvent this limitation.

As these specific illustrations and cases indicate, the handling of character data in information processing has always been troublesome. Small encoding mechanisms limit the potential trouble. Many compromises take place completely outside the character set while encoding the data.

On the other hand Unicode has enough space for lots of problems. This trouble has largely been centered around the inability to clearly separate the notions of syntax, semantics, and protocols.

The many demands placed on codepoints from Unicode has led to confusion in areas of text exchange, legacy interchange, glyph picking, and others. This confusion has intimidated adopters into non-conformance, consider Unicode normalization within XML and Java.

Therefore, there is a need in the art for a method and system which allows the present collection of convoluted, unused, and unimplementable Unicode algorithms to be recast in a more manageable context, and which allows the algorithms to become detectable, reversible as well as convertible. Further, there is a need in the art for this new method and system to provide extensibility to Unicode, such as is available in markup languages such as XML, without requiring new tag identifiers to be registered by a protocol controlling authority. Additionally, there is a need in the art for this new method and system to allow for an arbitrary number of control parameters to be specified in a data stream.

BRIEF DESCRIPTION OF THE DRAWINGS

The following detailed description when taken in conjunction with the figures presented herein provide a complete disclosure of the invention.

SUMMARY OF THE INVENTION

A general mechanism and process for including metadata within the Unicode framework is provided by the invention which is both flexible and extendable. The present invention allows Unicode to simply provide a mechanism for specifying higher order protocols, instead of embedding control functionality under the guise of characters. According to the new model, metadata is always distinct from character data. A provided tag mechanism allows for an unlimited number of possible identifiers, yet does not require any future codepoints to be registered by a standardization body or entity.

By adopting the framework of the invention, Unicode is freed to deal entirely with the definition of characters, which affords the greatest level of flexibility while still retaining the ability to perform simple parsing.

The present collection of convoluted, unused, and unimplementable algorithms (Bidi, Normalization, Line Breaking, etc.) can be recast in a more manageable context according to the metadata framework of the invention. The algorithms become detectable, reversible as well as convertible, as a result.

Further, through use of the invention, there is no longer any need for the traditional Unicode Control Layer. The syntax of controls are captured universally by the Metadata Layer, irrespective of whether the control relates to presentation or content. The indistinct boundary separating characters and control is now replaced by a well defined clear line. This precise separation makes applications that rely on Unicode easier to write and maintain.

As such, the invention provides a fully open extendable metadata mechanism in which complex semantics can be expressed through simple metadata tags.

DETAILED DESCRIPTION OF THE INVENTION

The invention provides an enhanced method for handling metadata associated with encoded text data through a number of changes and improvements to the Unicode "lightweight in-band signalling" (LWIB) method. It is preferably implemented in Java, but may equally well be implemented in any other suitable language.

The invention is realized in part by a computing platform, such as an IBM-compatible personal computer, Apple MacIntosh [TM], or other computer hardware platform, running a common operating system such as Linux, UNIX, Microsoft's Windows [TM], IBM'SAIX[TM] or OS/2 [TM]. According to the preferred embodiment, the method is encoded in the Java programming, which can be executed by many computing platforms suitably equipped with one of several widely-available Java interpreters, or compiled from Java to machine-specific executable code.

Figure 1:
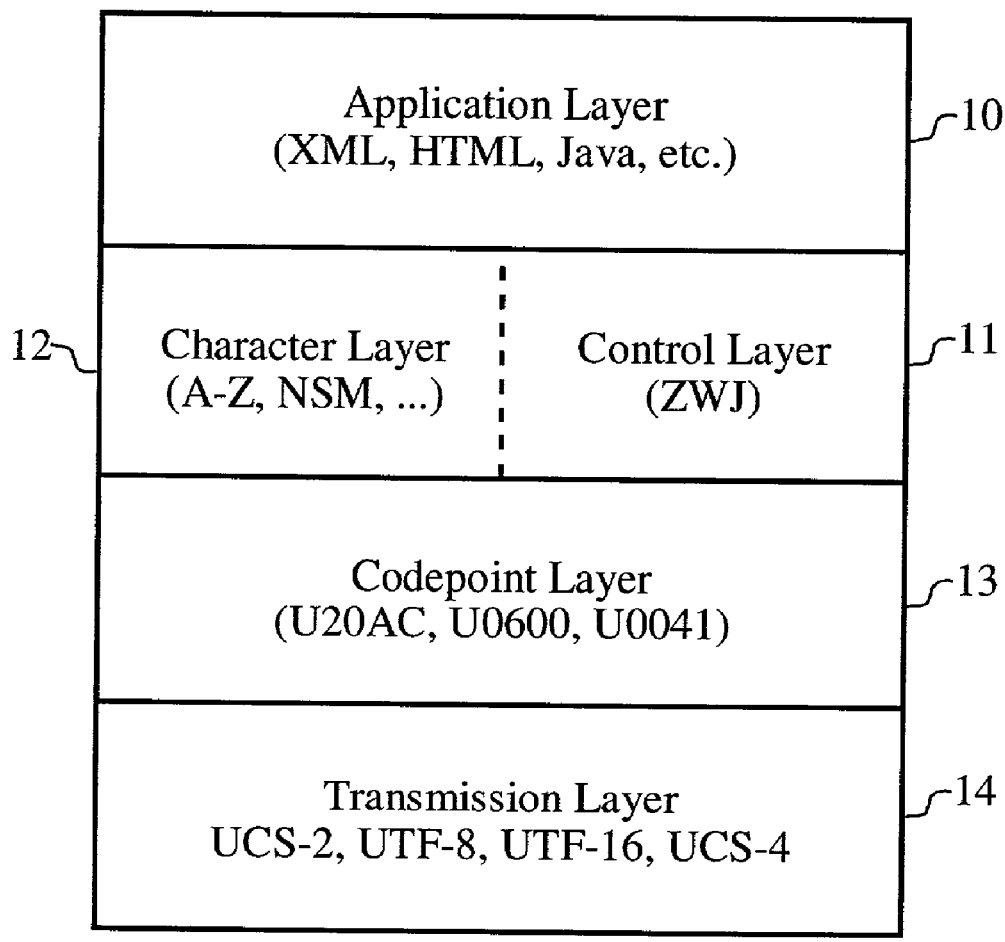
FIG. 1 shows the layered organization of Unicode.
Figure 2:
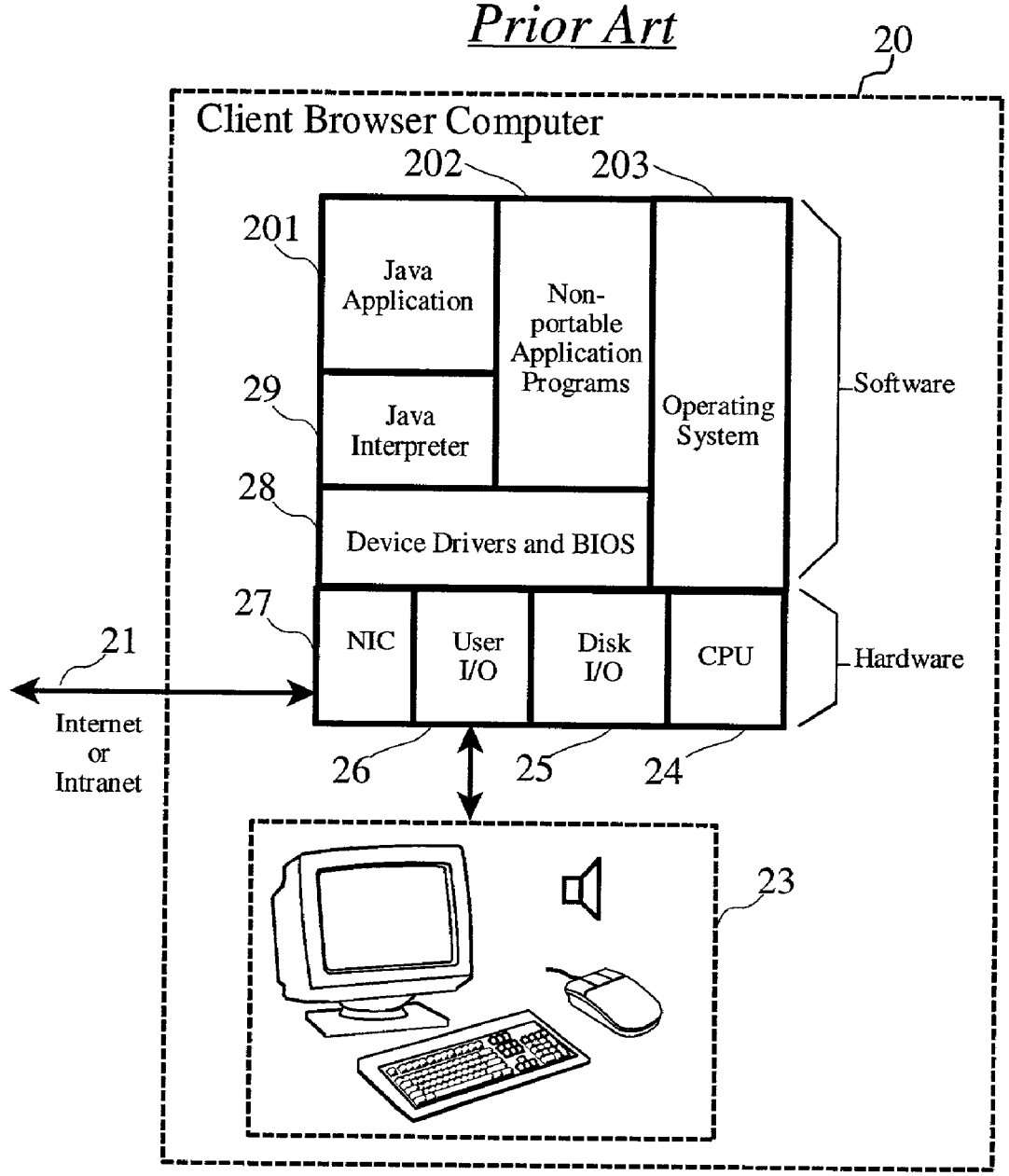
FIG. 2 shows the well-known organization of hardware computing platforms capable of executing Java programs or applets.

Turning to FIG. 2, a generalized organization of such a computer platform (20) is shown. The computer platform (20) has a central processing unit (CPU) (24), a set of device drivers and a basic input/output system (BIOS) (28), and typically an operating system (203), such as mentioned previously. Most computer platforms, such as a personal computer, are also equipped with disk interfaces (25) and disks; user device I/O (26) to interface to keyboards, pointing devices, and a display; and a network interface card or device (27) allowing communications to a computer network, wireless network, or the Internet. Some computer platforms, such as personal digital assistants, web-enabled telephones, and Internet appliances may not be provided with all of these components, but in general, the functionality of these components is present in some form.

The computer platform (20) is also typically provided with one or more non-portable, machine-specific application programs (202).

According to the preferred embodiment, the computer platform is provided with a Java interpreter (201), which are freely available for a variety of operating systems and computer platform, and which are well-known in the art.

The remaining disclosure of the invention is presented relative to the computer program implementation of the method for incorporating and interpreting metadata embedded into Unicode data streams.

Figure 3:
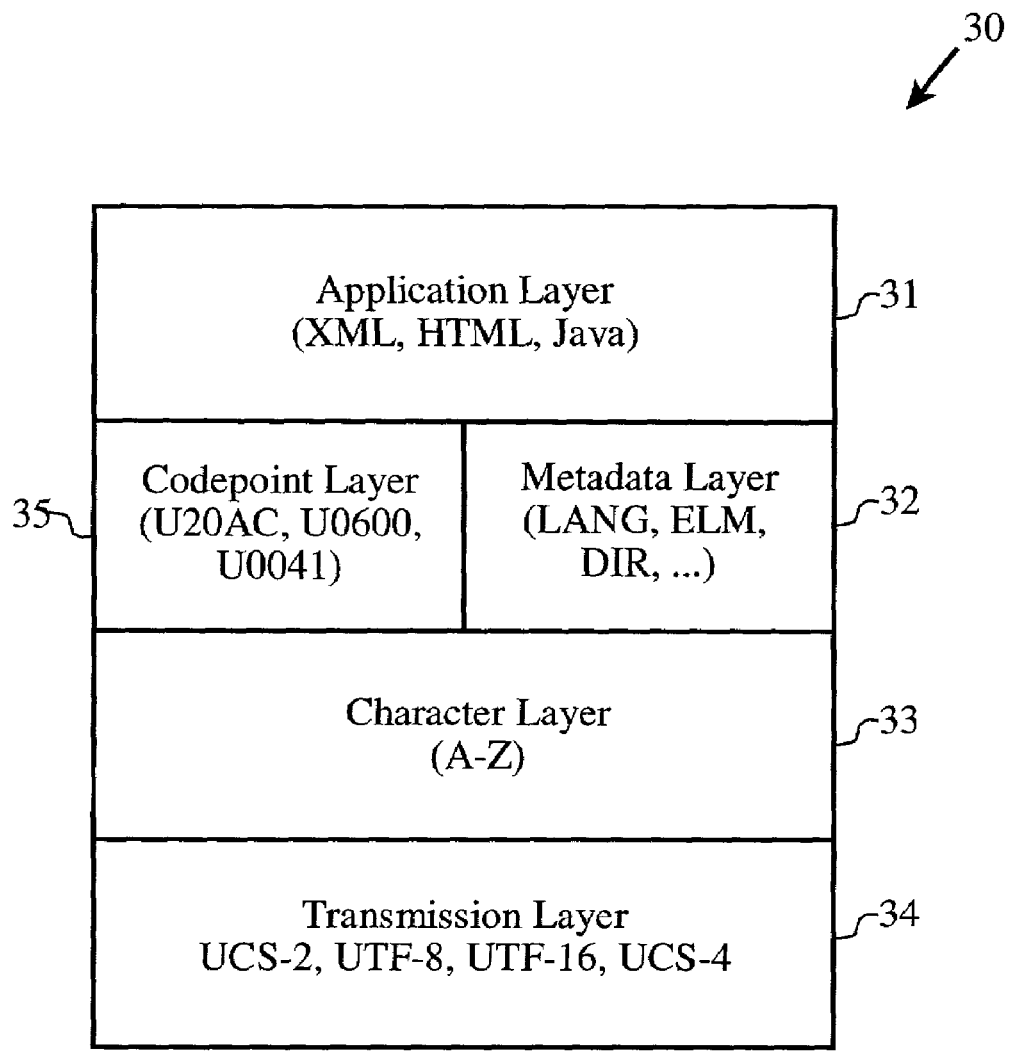
FIG. 3 shows the layered organization of the invention.

Turning to FIG. 3, the new layered organization (30) of the invention is shown, including an application layer (31), character layer (35), metadata layer (32), codepoint layer (33), and transmission layer (34). Unlike the general Unicode model, this new model provides for a distinctly separate character layer (35) and metadata layer (32) through the use of metadata embedded in Unicode data, resolving the otherwise ambiguous definition of character and control codes.

First, the method keeps the copy of the ASCII graphic characters and the cancel tag, as in the Unicode LWIB, but it omits the fixed codepoint tag identifiers. In their place, two new characters are employed, a tag separator U000E0001 and a tag argument separator U000E0002, as shown in TABLE 5.

TABLE 5

New Characters in the Method of the Invention

| Tag Characters | UCS-4 | Visual Representation |
|---|---|---|
| separator | U000E0001 | \| |
| argument separator | U000E0002 | = |
| cancel | U000E007F | ~ |
| space | U000E0020 | |
| graphic characters | U000E0021-U000E007E | a–z, A–Z , 0–9, etc. |

Use of these new characters is similar to the methods employed by SGML, XML, and HTML. As such, these new characters provide an easy migration path for embedding XML-like protocols within Unicode. The use of these characters is by no means required—higher applications may chose alternative methods.

The tag separator character is used to separate consecutive tags from one another, while the tag argument separator is used to delineate multiple arguments of a tag. This aspect of the invention allows the same characters to be used for tag values as well as tag identifiers. Further, tag identifiers are spelled out, rather than being assigned to a fixed single codepoint.

After all the parameters for the first metatag are inserted in the character stream, subsequent metatags are inserted separated by tag separators (47, 48), each being followed any parameters and parameter separators as needed.

This allows the use of tags to remain simple. First, the tag is spelled out using the ASCII tag characters, followed by a tag argument separator. This provides for an arbitrary number of tag values for a tag identifier, each being separated by a tag argument separator.

A tag identifier is terminated by either encountering a tag argument separator, a tag separator, or a non-tag character. This still allows for relatively simple parsing.

Figure 4:
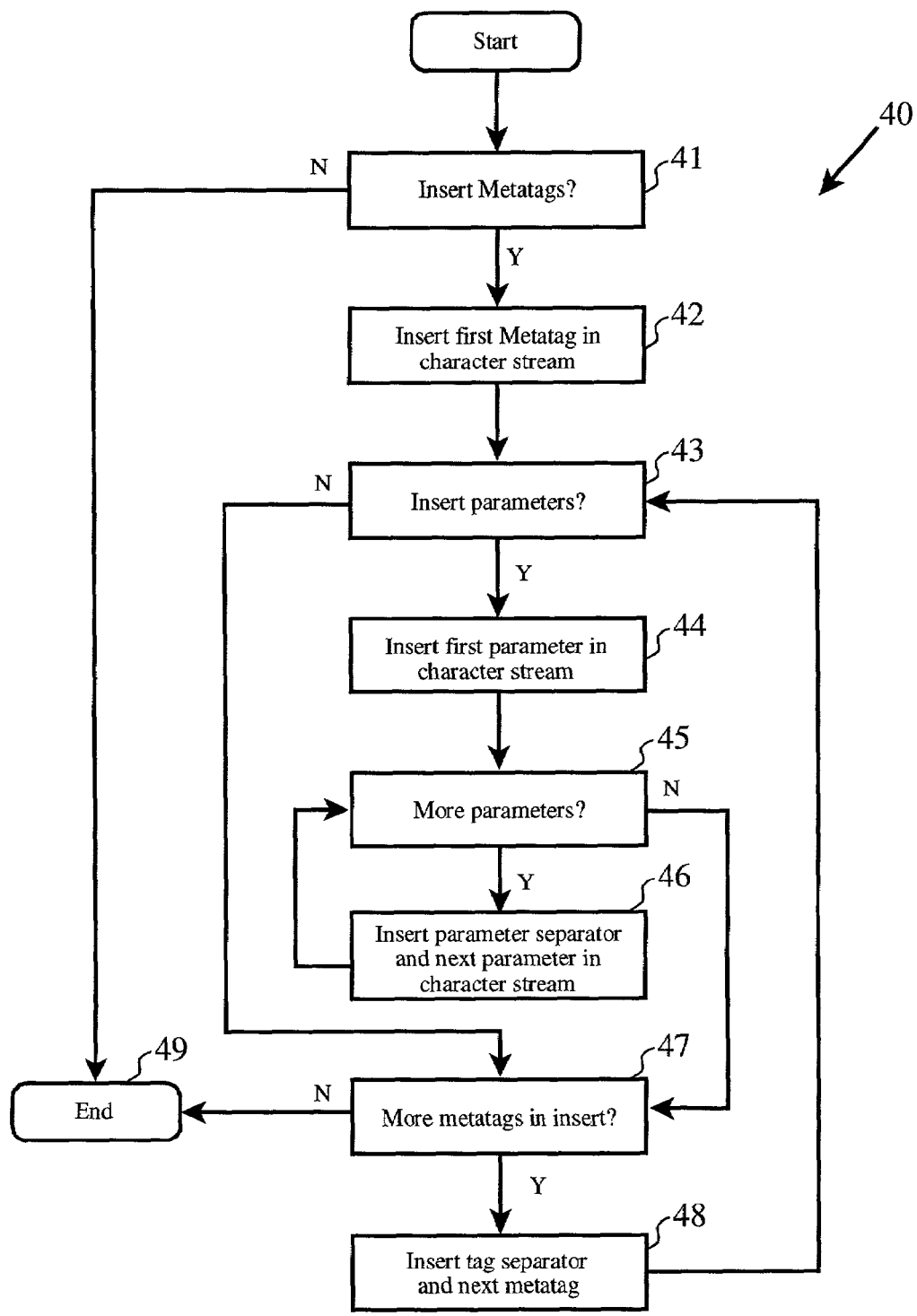
FIG. 4 illustrates the logical flow of encoding metatags and parameters into character streams according to the invention.

Turning to FIG. 4, the fundamental logic flow of the invention for encoding metatags into Unicode data is shown. If metatags are to be inserted into the Unicode data (41), then the first metatag is inserted (42) in the character stream accordingly. If any parameters are to be included with the first metatag (43), then the first parameter is inserted (44) following the metatag. If more than one parameter is to be inserted following the first metatag (45), these parameters are inserted following their metatag, separated by parameter separators (45, 46). Decoding of this encoding scheme is done by following the reverse process, first finding (instead of inserting) a first tag, then parsing for parameters followed by parameter separators, and the parsing for subsequent metatags and parameters.

In the following disclosure, tag characters are represented enclosed in braces "{ } ", the vertical bar character "|" depicts the tag separator, the equals sign "=" denotes the tag argument separator, and the tilde "~" will represent the tag cancel character. For example, line 1 in TABLE 6 FIG. 6 shows a stream with two embedded tags "XX" and "YY". In this example, the tag "XX" has one argument "a", while the "YY" tag has two arguments "b" and "c".

TABLE 6

An Example of the Data using the New Metatag Method def{XX}={a}|{YY}={b}={c}ghi~{YY}jkl~{XX}

The example suggests the nesting of "YY" within "XX". The semantics of such combinations are left to protocol designers rather than the metadata. This affords the greatest flexibility, and yet still retains the ability to perform simple parsing.

Further, this method allows a standardization body such as Unicode to simply be in the business of defining mechanism rather than mechanism and policy. It is possible that a standards body such as Unicode could act as the "registrar" of new tag identifiers while working in conjunction with other standards bodies. This however, does not preclude private tags from being defined for those cases in which widespread protocol adoption is not required, which is another advantage of the present invention.

According to another advantage and characteristic of the invention, the semantics of the cancel tag will may be left to a protocol designer. It is possible that in some protocols the cancel tag might "undo" the last tag, while in others, it may act as a end marker for terminating scope. Additionally, there is no requirement that a cancel tag be used at all.

The example of TABLE 7 shows how the language tag may be represented in the new tagging model of the invention. Line 1 in TABLE 7 is copied from TABLE 4 for reference, and line 2 of TABLE 7 shows the language tag spelled out with the two tag arguments being clearly delineated. The spelling out of tag identifiers is a negligible processing requirement when balanced against the flexibility and advantages of this method.

TABLE 7

Example of "Spelling Out" the Language Tag

| 1 | 000E0001 fr-FR french text U000E0001 U000E007F |
| 2 | {LANG}={fr}={FR} french text~{LANG} |

Currently, the Unicode reference Bidirectional Algorithm treats tag characters as having the property of left-to-right. At first, this does not seem problematic as the tags and the tag values should always be interpreted as left-to-right. Unfortunately the tags may inadvertently influence the resolution of weak and neutral types due to their juxtaposition. The example in TABLE 8 demonstrates this error.

In TABLE 8, Arabic characters are represented in upper case. Line 1 is a sequence of characters in logical order, line 2 is the expected resultant display ordering, and line 3 is the actual rendered display ordering.

TABLE 8

Example Error in Bidirectional Processing

| 1 | CIBARA {LANG}={ar}={EG}, 123 |
| 2 | 123, {LANG}={ar}={EG} ARABIC |
| 3 | {LANG}={ar}={EG}, 123 ARABIC |

The display ordering on line 3 of TABLE 8 is incorrect because the tag characters inadvertently participated in bidirectional processing. This problem is solved by introducing another new bidirectional property, "ignore", according to the present invention.

This enables the Bidirectional Algorithm to continue to function properly, while also protecting the semantics of tags. Characters that possess the "ignore" type do not have any direction. These characters are prevented from participating in the Unicode Bidirectional Algorithm.

Traditionally, text processes manipulated ASCII data with the implicit understanding that every codepoint equated to a single character and in turn a single text element, which then served as a fundamental unit of manipulation. In most cases this assumption held, especially given that only English text was being processed.

Multilingual information processing, however breaks the assumption that codepoints, characters, and text elements are all equal. Text elements are directly tied to a text process, script, and language. Common encodings today provide an abstract set of characters directly mapped onto set of numerals. The abstract characters are then grouped to form text elements.

In some cases, a text element may still equate to a single character, while in other situations, a text element may be comprised of several characters. For example, in Spanish the character sequence "ll" is treated as a single text element when sorted, but is treated as two text elements "l" and "l" when printed.

Unicode relies on an abstract notion of characters and text elements. Unfortunately, a general mechanism for indicating text elements is lacking. In some instances a text element is implicitly specified through a sequence of characters. For example, line 1 in TABLE 9 shows how a base character and a non spacing diacritic combine to form a single text element, line 2.

TABLE 9

Example Unicode Character Combining

| 1 | U00D6 Ö decomposed |
| 2 | U004F U0308 Ö precomposed |

In other cases, text elements are explicitly specified by control codes. In particular, Unicode uses control codes for forming visual text elements: the zero width joiner U200D and the zero width non joiner U200C control codes. These characters affect ligature formation and cursive connection of glyphs. The intended semantic of the zero width non joiner is to break cursive connections and ligatures. The zero width joiner is designed to form a more highly connected rendering of adjacent characters.

For example, line 1 in TABLE 10 shows the sequence of codepoints for Unicode constructing a ligature. The characters x and y represent arbitrary characters. Line 2 shows how the zero width non joiner can be used to break a cursive connection. However, problems arise when one wishes to suppress ligatures while still promoting cursive connections. In this situation, Unicode recommends combining the zero width nonjoiner and the zero width joiner, such as shown in line 3 FIG. 10.

TABLE 10

Example Unicode Joiners

| 1 | x U200D y |
| 2 | x U200C y |
| 3 | x U200D U200C U200D y |

Rather than using control codes with complicated semantics and implicit sequences of characters to form text elements, a simple generalized mechanism is provided by the present invention. Because Unicode has no general way to indicate that sequences of characters should be viewed as a single text element, the currently approach in the art relies on a a higher order protocol outside of Unicode, such as XML. The trouble in taking such approach is that it is ill suited for this purpose. XML is designed to describe the structure of documents and collections of data not individual characters and text elements. XML requires data to strictly adhere to a hierarchical organization. This may be appropriate for documents, but may be troublesome for a simple text stream.

The model that is really required needs to be organized around characters and text elements, as is provided by the present invention. This is achieved through metadata tags and simple protocols. For example, the zero width joiner and zero width non joiner characters can be described by a new tag, such as text element "ELM", using the new method. Then, the ELM tag can be used to group multiple characters together so that they can be treated as a single grapheme or text element. For example, line 1 in TABLE 11 shows a text element "xy" for all purposes.

TABLE 11

Example use of Invention to Define a Text Element Tag

| 1 | {ELM}xy~{ELM} |
| 2 | {ELM}={LIG}xy~{ELM} |
| 3 | {ELM}={JOIN}xy~{ELM} |
| 4 | {ELM}={COLL}ch~{ELM} |
| 5 | {ELM}={CASE}SS~{ELM} |

When characters are grouped together it may be for the purpose of rendering, sorting, or case conversion. The purpose of the grouping does not need to be understood by Unicode. The semantics should only be determined by processes that make direct use of such information. The tag is simply a mechanism for signaling higher order semantics.

For example, line 2 in TABLE 11 shows a text element "xy" for the purposes of forming ligatures, but not searching/sorting, and line 3 demonstrates the text element "xy" being cursively connected while yet suppressing ligature formation.

Additionally the new ELM tag can be used to form other semantic groupings. For example, in Spanish when "c" is followed by "h", the two single characters combine to form the single text element "ch", such as shown in line 4 of TABLE 11. This grouping does not effect rendering, but has implications in sorting. In German however, groupings affect case conversion. For example, the character sequence "SS" when converted to lowercase results in the single etset character "β", such as in line 5 of TABLE 11.

As such, plain text streams that contain characters of varying direction pose a particular problem for determining the correct visual presentation. There are several instances in which it is nearly impossible to render bidirectional text correctly in the absence of any higher order information. In particular, picking glyphs requires that a rendering engine have knowledge of fonts.

The Unicode Bidirectional Algorithm operates as a stream to stream conversion. At first, this seems fine given that Unicode is a character encoding mechanism and not a glyph encoding scheme. This output, however is insufficient by itself to correctly display bidirectional text. If a process is going to present bidirectional text, then the output needs to be glyphs and glyph positions. This presents a problem for Unicode. The Unicode Bidirectional algorithm can not possibly produce this output and yet still remain consistent with Unicode's overall design goals, that of a character encoding scheme.

Unicode's algorithms should only be based on character attributes and codepoints. By introducing metadata according to the invention, however, the improved Unicode would permit a cleaner division of responsibilities. Algorithms could be recast to take advantage of this division. In particular, the output of the Bidirectional Algorithm could be changed to raw Unicode with embedded metadata "tags". This would separate the responsibility of determining directional boundaries from glyph picking.

The core of the reference Unicode Bidirectional algorithm is centered around three aspects: resolving character types, reordering characters and analyzing mirrors. The bidirectional algorithm is applied to each paragraph on a line by line basis. During resolution, characters that do not have a strong direction are assigned a direction based on the surrounding characters or directional overrides. In the reordering phase, sequences of characters are reversed as necessary to obtain the correct visual ordering. Finally each mirrored character (parenthesis, brackets, braces, etc.) is examined to see if it needs to be replaced with its symmetric mirror.

Unfortunately, this method has the effect of making an irreversible change to the input stream. The logical ordering is no longer available. This inhibits the construction of an algorithm that takes as input a stream in display order and produces as output its corresponding logical ordering. The example in TABLE 12 illustrates this problem. In TABLE 12, Arabic letters are depicted by upper case latin letters while the right square bracket "[" indicates a right to left override U202E. In TABLE 12, line 1 is a stream in display order, and lines 2 and 3 are streams in logical order. If the bidirectional algorithm is applied to line 2 or line 3, the result is line 1 in either case.

TABLE 12

Example Mapping from Display Order to Logical Order

| 1 | 123 (DCBA) |
|---|---|
| 2 | (ABCD) 123 |
| 3 | ]123 (ABCD) |

It is also impossible to tell whether a stream has been processed by the Bidirectional Algorithm. The output does not contain any identifying markers to indicate that a stream has been processed. This makes the transmission of bidirectional data problematic. A process can never be sure whether an input stream has undergone bidirectional processing. To further complicate the situation the bidirectional algorithm must be applied on a line by line basis. This is not always easy to accomplish if display and font metrics are not available.

In this paper we propose the introduction of three tags for bidirectional processing: "PAR" paragraph, direction "DIR", and mirror "MIR".

The PAR tag signifies the beginning of a paragraph. It takes one argument, the base direction of the paragraph either right "R" or left "L".

The DIR tag takes one argument as well, the resolved segment's direction either "L" or "R".

The MIR tag does not require any argument. Its presence indicates that the preceding character should be replaced by its symmetric mirror. The scope of the DIR tag is terminated by either a cancel tag, a PAR tag, or the end of the input stream.

For example, in TABLE 13, line 1 represents a stream of characters in logical order and Line 2 is the output stream after running the bidirectional algorithm using tagging. Arabic letters are represented by upper case latin letters, and tag characters are enclosed in brackets "{ }". Again, the equal sign represents the tag argument separator, the vertical bar represents the tag separator "U000E0001", and tilde represents the cancel tag character. The output of the algorithm only inserts tags to indicate resolved directional boundaries and mirrors. The data characters still remain in logical order.

TABLE 13

Example Bidirectional Processing
Using Metatags of the Invention

| 1 | (ABCD) 123 |
|---|---|
| 2 | {PAR}={R}\|{MIR}(ABCD{MIR}) {DIR={L}\|123~{DIR}\|~{PAR}\| |

Furthermore, the bidirectional standard Unicode embedding controls "LRE","RLE", "LRO", "RLO", and "PDF" can be eliminated because they are superseded by the DIR tag. These controls act solely as format effectors. They convey no other semantic information and are unnecessary when viewed in light of the DIR tag.

The introduction of these new tags does not require a re-implementation of the entire standard Unicode Bidirectional Algorithm, however. The method only requires two changes to accommodate the new tags. In those places where the text is to be reversed, a DIR tag is inserted to indicate the resultant direction rather than actually reversing the stream itself. In those places where a symmetric mirror is required, a MIR tag is inserted to indicate that this character should be replaced with its corresponding mirror.

According to the preferred embodiment, the invention's Javafunctions "taglevel" and "tagrun" shown in TABLE 17, lines 1 through 45, replace functions "reverseRun", "reverseLevels" and "reorder" in the reference Unicode method. The mirror function has been changed to insert a MIR tag rather than directly replacing a character with its symmetric mirror.

The Bidirectional Algorithm may also be extended to directly interpret tags itself. This would be extremely beneficial in cases where the data and the implicit rules do not provide adequate results. For example, in Farsi, mathematical expressions are written left to right while in Arabic they are written right to left. [0111] Under the standard reference Bidirectional Algorithm, control codes would need to be inserted into the stream to force correct rendering, such as shown in line 1 of TABLE 14 where the characters "LRE" and "PDF" represent the Unicode control codes Left to Right Embedding and Pop Directional Format respectively.

TABLE 14

Example Mathematical Expression

| 1 | LRE 1 + 1 = 2 PDF |
|---|---|
| 2 | {LANG}={fa}={IR}\|{MATH} 1 + 1 = 2~{MATH} |
| 3 | {LANG}={fa}={IR}\|{MATH}\|{DIR}={L} 1 + 1 = 2 ~{MATH}\|~{DIR} |

The extended Bidirectional Algorithm of the invention may address this through the addition of two tags: "MATH" and "LANG". These tags may be inserted into the stream to identify the language and that portion of the stream that is a mathematical expression. By using the tagging method of the invention, the output stream still remains in logical order with its direction correctly resolved without the need of control codes, such as shown in lines 2 and 3 of TABLE 14.

Turning to HTML for application of the invention, the HTML 4.0 specification introduces a bidirectional override tag "BDO" for explicitly controlling the direction by which a tag's contents should be displayed. Lines 1 and 2 in TABLE 15 illustrate the syntax of this tag.

TABLE 15

Example of HTML BDO Tag Usage

| | |
|---|---|
| 1 | <bdo dir="LTR">body content</bdo> |
| 2 | <bdo dir="RTL">body content</bdo> |

These HTML tags can be used in conjunction with the Unicode bidirectional tags through the method of the present invention. The Unicode tags can be directly converted into the HTML bidirectional tags. This allows for a clean division of responsibilities for displaying bidirectional data.

The Unicode metadata tags simply serve as bidirectional markers. Browsers can then directly render the resultant HTML. This permits the Unicode bidirectional algorithm to be free from the problems of determining font and display metrics.

The UniMeta program, presented in TABLE 18, takes as input a file encoded in UTF-8 which contains Unicode text in logical order with bidirectional tags, in lines 1-105. The UniMeta program then converts the input text into HTML. Each Unicode metadata tag is replaced with a corresponding HTML tag.

Currently, there is no corresponding tag for mirroring in HTML. When a Unicode MIR tag is found, it is simply ignored. The example in TABLE 16 illustrates the output from the UniMeta Java program. Lines 1 and 2 are copied from TABLE 13, and line 3 is the resultant HTML with BDO tags.

TABLE 16

Example Input and Output from UniMeta

| | |
|---|---|
| 1 | (ABCD) 123 |
| 2 | {PAR}={R}\|{MIR}(ABCD{MIR}) {DIR}={L}\|123~{DIR}\|~{PAR}\| |
| 3 | <bdo dir="rtl">(ABCD)<bdo dir="ltr">123</bdo></bdo> |

By using metadata tags with a Bidirectional Algorithm, a clear division of responsibilities is achieved. The bidirectional layout process is now divided into two separate and distinct phases, logical run determination and physical presentation. This permits character data to remain in logical order, yet still contain the necessary information for it to be correctly displayed. Additionally, any text process receiving such a stream is able to immediately detect that the stream has been bidirectionally processed.

As it will be recognized by those skilled in the art, the metadata model and method of the invention described herein is adaptable to other systems and other types of information, and thus is not limited to the specific examples disclosed herein. For example, when used in source programming languages, metadata characters could be used to indicate comments, enabling metatag-aware compilers to know exactly where comments were independent of context of the source code, making it unnecessary to have special comment starters, enders, or rules concerning their usage. This would also enable the development of tools such as "javadoc" in a more straightforward streamlined fashion. In fact, such tools could be written independent of language given that comments would always be expressed via metadata.

Furthermore, text processing languages such as TeX could be improved to incorporate the metadata methods disclosed herein. This would enable the creation of such tools as universal spell checkers. No longer would a spell checker need to understand the syntax of TeX commands. All TeX commands would simply be expressed through metadata.

As such, it will be recognized by those skilled in the art that many variations, alternate embodiments, and applications of the invention may be made without departing from the spirit and scope of the invention. Thus, the scope of the invention should be determined by the following claims.

TABLE 17

Example Java Source Code for BiDi Implementation

```
1  --Unicode metadata tags
2  dirL=map intToWord32 [0xe0044,0xe0049,0xe0052,
3  0xe0002,0xe004c,0xe0001]
4  dirR=map intToWord32 [0xe0044,0xe004c,0xe0052
5  0xe0002,0xe0052,0xe0001]
6  dirEnd=map intToWord32 [0xe007f,0xe0044,0xe0049
7  0xe0052,0xe0001]
8  parL=map intToWord32 [0xe0050,0xe0041,0xe0052,
9  0xe0002,0xe004c,0xe0001]
10 parR=map intToWord32 [0xe0050,0xe0041,0xe0052,
11 0xe0002,0xe0052,0xe0001]
12 parEnd=map intToWord32 [0xe007f,0xe0050,0xe0041
13 0xe0052,0xe0001]
14
15 --Mark the level with the bidi tags
16 tagLevel :: Int -> [Level] -> [Ucs4]
17 tagLevel_[]=[]
18 tagLevel level ((x,y,z):xs)
19 |level/=x&& even x
20 =dirL++(map character ((x,y,z):xs)) ++dirEnd
21 |level/=x&& odd x
```

TABLE 17-continued

Example Java Source Code for BiDi Implementation

```
22 =dirR ++(map character ((x,y,z):xs))++dirEnd
23 |otherwise
24 =map character ((x,y,z):xs)
25
26 -- Mark the run with the bidi tags
27 tagRun :: Int -> Run -> [Ucs4]
28 tagRun z (LL xs)=parL++concat (map (tagLevel z)
29 (groupBy levelEql (mirror xs)))++parEnd
30 tagRun z (LR xs)=parL++concat (map (tagLevel z)
31 (groupBy levelEql (mirror xs)))++parEnd
32 tagRun z (RL xs)=parR++concat (map (tagLevel z)
33 (groupBy levelEql (mirror xs)))++parEnd
34 tagRun z (RR xs)=parR++concat (map (tagLevel z)
35 (groupBy levelEql (mirror xs)))++parEnd
36
37 --Insert mirror tags
38 mirror :: [Level] -> [Level]
39 mirror []=[]
40 mirror ((x,y,R):xs)
41 |isMirrored y
42 =(x,0xe004d,R):(x,0xe0049,R):(x,0xe0052,R):(x,y,R)
43 : minor xs
44 |otherwise=(x,y,R):(mirror xs)
45 mirror (x:xs)=x:(mirror xs)
```

TABLE 18

Example Java Source Code for UniMeta

```
1 import java.util.*;
2 import java.io.*;
3
4 public class UniMeta {
5 BufferedReader dataIn;
6 String dirL="\udb40\udc44\udb40\udc49\udb40"+
7 "\udc52\udb40\udc02\udb40\udc4c"+
8 "\udb40\udc01",
9 dirR="\udb40\udc44\udb40\udc49\udb40"+
10 "\udc52\udb40\udc02\udb40\udc52"+
11 "\udb40\udc01",
12 dirEnd="\udb40\udc7f\udb40\udc44\udb40"+
13 "\udc49\udb40\udc52\udb40\udc01",
14 parL="\udb40\udc50\udb40\udc41\udb40"+
15 "\udc52\udb40\udc02\udb40\udc4c"+
16 "\udb40\udc01",
17 parR="\udb40\udc50\udb40\udc41\udb40"+
18 "\udc52\udb40\udc02\udb40\udc52"+
19 "\udb40\udc01",
20 parEnd="\udb40\udc7f\udb40\udc50\udb40"+
21 "\udc41\udb40\udc52\udb40\udc01",
22 mirror="\udb40\udc4d\udb40\udc49\udb40"+
23 "\udc52";
24
25 String lBDO="<bdo dir=\"ltr\">",
26 rBDO="<bdo dir=\"rtl\">",
27 lP="<p dir=\"ltr\">",
28 rP="<p dir=\"rtl\">",
29 endP="</p>",
30 endBDO="</bdo>";
31 //Open the input file
32 public UniMeta(String in) {
33 try {
34 FileInputStream fileIn=new FileInputStream(in);
35 InputStreamReader str=
36 new InputStreamReader(fileIn, "UTF8");
37 dataIn=new BufferedReader(str);
38 }
39 catch (Exception e) {
40 System.out.println("Error opening file"+in);
41 return;
42 }
43 }
44 //Replace the unicode meta tags with HTML tags
45 private String replace(String in) {
46 StringBuffer out=new StringBuffer();
47 int i=0;
48
49 while(i<in.length()) {
50 if (in.startsWith(parL,i)) {
51 out.append(lP+lBDO);
52 i+=parL.length();
53 }
54 else if (in.startsWith(parR,i)) {
55 out.append(rP+rBDO);
56 i+=parR.length();
57 }
58 else if (in.startsWith(dirL,i)) {
59 out.append(lBDO);
60 i+=dirL.length();
61 }
62 else if (in.startsWith(dirR,i)) {
63 out.append(rBDO);
64 i+=dirR.length();
65 }
66 else if (in.startsWith(dirEnd,i)) {
67 out.append(endBDO);
68 i+=dirEnd.length();
69 }
70 else if (in.startsWith(parEnd,i)) {
71 out.append(endBDO+endP);
72 i+=parEnd.length();
73 }
74 else if (in.startsWith(mirror,i)) {
75 i+=mirror.length();
76 }
```

TABLE 18-continued

Example Java Source Code for UniMeta

```
77 else {
78 out.append(in.charAt(i));
79 ++i;
80 }
81 }
82 return (out.toString());
83 }
84
85 //Process the input stream, generate output to stdio
86 public void parse() {
87 String in=null;
88 System.out.println("<html>");
89 try {
90 while ((in=dataIn.readLine()) !=null) {
91 System.out.println(replace(in));
92 }
93 }
94 catch(Exception e) {
95 System.out.println("Error parsing file");
96 return;
97 }
98 System.out.println("</html>");
99 }
100
101 public static void main(String[]args) {
102 UniMeta input=new UniMeta(args[0]);
103 input.parse();
104 }
105 }
```

What is claimed is:

1. A computer-implemented method for providing metadata within a Unicode character stream said method comprising the steps of:

encoding into one or more metatags information regarding display rendering for at least one character in a Unicode character stream;

inserting said metatags into said Unicode character stream by spelling at least one tag identifier; and inserting one or more metatag separator characters between adjacent metatags if more than one metatag has been inserted without Unicode intervening between adjacent metatags, thereby producing a modified Unicode character stream having separator-delimited metadata embedded within it.

2. The method as set forth in claim 1 further comprising the steps of:

inserting one or more parameters following at least one metatag with which it is associated; and inserting a parameter separator between multiple parameters associated with a metatag if more than one parameter has been inserted so as to create a separator-delimited parameter list following a metatag.

3. The method as set forth in claim 2 wherein said step of inserting one or more metatags comprises inserting a paragraph metatag, and wherein said step of inserting one or more parameters comprises inserting a right-to-left or a left-to-right directional parameter following a paragraph metatag which indicate a direction in which the character stream following the paragraph metatag and parameter is to be rendered for display.

4. The method as set forth in claim 2 wherein said step of inserting one or more metatags comprises inserting a direction metatag, and wherein said step of inserting one or more parameters comprises inserting a right-to-left or a left-to-right directional parameter following a direction metatag which indicate a direction in which the character stream following the direction metatag and parameter is to be rendered for display.

5. The method as set forth in claim 4 wherein said steps of inserting one or more metatags and inserting one or more parameters following metatags comprise the steps of replacing hyper text markup language bi-directional output (BDO) tags with said direction metatags and directional parameters.

6. The method as set forth in claim 2 wherein said step of inserting one or more metatags comprises inserting a mirror metatag which indicates the characters following the mirror metatag is to be presented in mirror fashion.

7. The method as set forth in claim 2 wherein said step of inserting one or more metatags comprises inserting a math metatag and a language metatag such that portions of the character stream which represent mathematical expressions are delimited from portions of the character stream which represent language.

8. The method as set forth in claim 1 wherein said step of inserting one or more metatags into a Unicode character stream comprises inserting an element metatag which describes zero width joiner and zero width non joiner characters, such that multiple characters may be grouped together for treatment as a single grapheme or text element.

9. A computer readable medium encoded with software causing a computer to perfom the following actions for embedding display rendering metadata into character streams:
   encode into one or more metatags information regarding display rendering for at least one character in a Unicode character stream:
   insert said metatags into said Unicode character stream by spelling at least one tag identifier; and
   insert one or more metatag separator characters between adjacent metatags if more than one metatag has been inserted without Unicode intervening between adjacent metatags thereby producing a modified Unicode character stream having separator-delimited metadata embedded within it.

10. The computer readable medium as set forth in claim 9 further comprising software for performing the following actions:
   insert one or more parameters following at least one metatag with which it is associated; and
   insert a parameter separator between multiple parameters associated with a metatag if more than one parameter has been inserted so as to create a separator-delimited parameter list following a metatag.

11. The computer readable medium as set forth in claim 10 wherein said software for inserting one or more metatags comprises software for inserting a paragraph metatag, and wherein said software for inserting one or more parameters comprises software for inserting a right-to-left or a left-to-right directional parameter following a paragraph metatag which indicate a direction in which the character stream following the paragraph metatag and parameter is to be rendered for display.

12. The computer readable medium as set forth in claim 10 wherein said software for inserting one or more metatags comprises software for inserting a direction metatag, and wherein said software for inserting one or more parameters comprises software for inserting a right-to-left or a left-to-right directional parameter following a direction metatag which indicate a direction in which the character stream following the direction metatag and parameter is to be rendered for display.

13. The computer readable medium as set forth in claim 12 wherein said software for inserting one or more metatags and inserting one or more parameters following metatags comprise software for replacing hyper text markup language bi-directional output (BDO) tags with said direction metatags and directional parameters.

14. The computer readable medium as set forth in claim 9 wherein said software for inserting one or more metatags into a Unicode character stream comprises software for inserting an element metatag describes zero width joiner and zero width non joiner characters, such that multiple characters may be grouped together for treatment as a single grapheme or text element.

15. The computer readable medium as set forth in claim 9 wherein said software for inserting one or more metatags comprises software for inserting a mirror metatag which indicates the characters following the mirror metatag is to be presented in mirror fashion.

16. The computer readable medium as set forth in claim 9 wherein said software for inserting one or more metatags comprises software for inserting a math metatag and a language metatag such that portions of the character stream which represent mathematical expressions are delimited from portions of the character stream which represent language.

17. A computer-implemented system for embedding metadata within a Unicode character stream, said system comprising:
   an encoder for encoding into one or more metatags information regarding display rendering for at least one character in a Unicode character stream;
   a metatag inserter for inserting said metatags into said Unicode character stream by spelling at least one tag identifier; and
   a tag separator inserter for inserting one or more metatag separator characters between adjacent metatags if more than one metatag has been inserted without Unicode intervening between adjacent metatags, thereby producing a modified Unicode character stream having separator-delimited metadata embedded within it.

18. The system as set forth in claim 17 further comprising:
   a parameter inserter for inserting one or more parameters following at least one metatag with which it is associated; and
   a parameter separator inserter for inserting a parameter separator between multiple parameters associated with a metatag if more than one parameter has been inserted, which creates a separator-delimited parameter list following a metatag.

19. The system as set forth in claim 18 wherein said metatag inserter is adapted to insert a paragraph metatag, and wherein said parameter inserter is adapted to insert a right-to-left or a left-to-right directional parameter following a paragraph metatag which indicate a direction in which the character stream following the paragraph metatag and parameter is to be rendered for display.

20. The system as set forth in claim 18 wherein said metatag inserter is adapted to insert a direction metatag, and wherein said parameter inserter is adapted to insert a right-to-left or a left-to-right directional parameter following a direction metatag which indicate a direction in which the character stream following the direction metatag and parameter is to be rendered for display.

21. The system as set forth in claim 20 wherein said metatag inserter and said parameter inserter are adapted to replace hyper text markup language bi-directional output (BDO) tags with said direction metatags and directional parameters.

22. The system as set forth in claim 18 wherein said metatag inserter is adapted to insert a mirror metatag which indicates the characters following the mirror metatag is to be presented in mirror fashion.

23. The system as set forth in claim 18 wherein said metatag inserter is adapted to insert a math metatag and a language metatag such that portions of the character stream which represent mathematical expressions are delimited from portions of the character stream which represent language.

24. The system as set forth in claim 17 wherein said metatag inserter is adapted to insert an element metatag which describes zero width joiner and zero width non joiner characters, such that multiple characters may be grouped together for treatment as a single grapheme or text element.

* * * * *